United States Patent [19]

Bowers et al.

[11] Patent Number: 4,494,403
[45] Date of Patent: Jan. 22, 1985

[54] FILTER TESTING APPARATUS AND METHOD

[75] Inventors: Cecil W. Bowers, Chocowinity; Ivey G. Thompson; Thomas T. Allan, both of Washington, all of N.C.

[73] Assignee: Flanders Filters, Inc., Washington, N.C.

[21] Appl. No.: 398,405

[22] Filed: Jul. 14, 1982

[51] Int. Cl.³ .............................................. G01M 3/20
[52] U.S. Cl. .................................. 73/40.7; 73/863.58
[58] Field of Search .............. 73/40.7, 863.53, 863.54, 73/863.55, 863.58

[56] References Cited

U.S. PATENT DOCUMENTS

| 3,395,514 | 8/1968 | Bub. | |
|---|---|---|---|
| 3,522,724 | 8/1970 | Knab. | |
| 3,765,225 | 10/1973 | Rivers. | |
| 3,885,437 | 5/1975 | Reagan | 73/863.58 |
| 4,055,075 | 10/1977 | Allan et al. | |
| 4,324,568 | 4/1982 | Wilcox et al. | |

OTHER PUBLICATIONS

Hepa Filters and Filter Testing, 2nd Edition, 17 pp., Published by Flanders Filters, Inc., 1981.

Nuclear Air Cleaning Handbook, Burchstead et al., Printed by Oak Ridge National Lab, pp. 187–208, 1976.

Primary Examiner—Stephen A. Kreitman
Assistant Examiner—Joseph W. Roskos
Attorney, Agent, or Firm—Bell, Seltzer, Park & Gibson

[57] ABSTRACT

A filter testing apparatus and method are provided wherein a challenge aerosol or the like is introduced upstream of the filter, and the downstream face of the filter is scanned with an air sampling probe to detect for the presence of leaking aerosol. The apparatus comprises a generally rectangular frame, and an air sampling probe which is mounted to the frame so as to be movable in a predetermined pattern wherein the entire face of an adjacent filter is scanned. The assembly may be removably mounted in a filter housing immediately downstream of the filter, or mounted on a framework downstream of a bank of several filters. In the latter instance, the assembly is sequentially indexed to a position alignment with each filter, and an upstream aerosol dispersion assembly is also provided which is correspondingly indexed across the filter bank. The rate of leaking challenge aerosol is continuously plotted on a moving sheet of paper to thereby permit the magnitude of a leak and its location on the face of the filter to be readily determined.

29 Claims, 9 Drawing Figures

FILTER TESTING APPARATUS AND METHOD

The present invention relates to a novel method and apparatus for testing a high efficiency particulate air filter, or bank of such filters, for the purpose of locating minute leaks.

By definition, a high efficiency particulate air (HEPA) filter has an efficiency of removing a minimum of 99.97 percent of a challenge material, which typically comprises a thermally generated dioctylhphalate (DOP) aerosol whose particle size is 0.3 microns. This efficiency is a manufacturing standard, which the filter producer must maintain.

It is recognized that the DOP efficiency of a filter represents the average efficiency of that filter. Minute areas of greater penetration, commonly referred to as pinhole leaks, are often present, either in the edge sealant between the filter media and the filter frame, or in the media itself. When the filter is tested for overall efficiency, these pinhole leaks are diluted by the greater volume of clean air passing through the remaining portions of the filter. Thus the pinhole leaks can be tolerated as long as the overall penetration through the filter does not exceed the design efficiency.

In many sensitive applications however, these pinhole leaks cannot be tolerated, even though the overall efficiency of the filter is within tolerances. For example, where HEPA filters are part of a laminar flow air supply system for a clean room or work area, it is not possible to effectively dilute the pinhole leaks with the greater volume of air passing through the filter, since under laminar flow conditions, the leaking particles will flow in a condensed stream into the working area. Thus a sensitive product or the like within the clean room or work area might be located directly downstream of a pinhole leak, and thereby be subjected to significant contamination. As a further example, HEPA filters which are installed in a nuclear air cleaning system, or other hazardous material containment application, cannot tolerate pinhole leaks, and such filter systems are usually subjected to stringent in-place testing procedures to verify the absence of significant pinhole leaks.

At the present time, the standard procedure for checking for pinhole leaks involves challenging the filters with a DOP aerosol introduced upstream of the filters, while the downstream side of the filters is manually scanned or probed utilizing a small, hand held air sample pick-up tube. The air sample is directed from the pick-up tube through a forward light scattering photometer, which detects leaking challenge material and thereby identifies pinhole leaks. Once located, the leaks can then be patched.

As will be appreciated, the manual scanning of filters for the purpose of locating pinhole leaks is a time consuming operation, particularly in the case of large filter banks. In addition, the procedure requires that a technician be physically located adjacent the filters, which may not be possible in the case of relatively small filter housings, or by reason of the particular configuration of the ductwork. Finally, in exhaust containment systems where hazardous materials may be present in the duct, the technician must be provided with a protective suit to minimize the opportunity for contamination, which of course further complicates the scanning operation.

It is accordingly an object of the present invention to provide a filter testing apparatus and method which effectively overcomes the above noted problems associated with the present procedure for manually scanning filters to locate pinhole leaks.

It is a more particular object of the present invention to provide a filter testing apparatus and method which is able to automatically scan a filter for pinhole leaks, without requiring the presence of a technician adjacent the filter.

It is also an object of the present invention to provide a filter testing apparatus and method which is able to automatically identify pinhole leaks of a predetermined magnitude, and to indicate the location of such leaks to thereby facilitate their repair.

It is still another object of the present invention to provide a filtering testing apparatus and method for automatically and remotely testing each filter in a large bank of parallel filters.

These and other objects and advantages of the present invention are achieved in the embodiments illustrated herein by the provision of a filter testing apparatus and method which includes a generally rectangular frame which is sized to generally conform to the outline of a filter to be tested, an air sampling probe mounted to the frame, and drive means for sequentially traversing the probe in the lateral direction across the frame and indexing the probe in the tranverse direction upon the probe reaching the end of each lateral traverse, and so that the entire face of an adjacent filter may be automatically scanned by the probe. Also, means are provided for conveying air received in the probe to a remote location for continuous analysis or the like.

In the preferred embodiment, the means for analyzing the air has the ability to determine the rate of leaking challenge material, and also to plot the rate of leaking challenge material, to thereby permit the magnitude of a leak and its location on the face of the filter to be readily determined.

In the case of a large filter bank, the frame mounting the air sampling probe constitutes a scanning assembly which is sized to generally conform to the size of the individual filters in the bank, and a framework is provided for mounting the scanning assembly at a location immediately downstream of the filter bank so that the assembly may be selectively indexed to a position aligned with each filter in the bank. Thus the assembly may be sequentially moved to a position aligned with each filter, and the probe may be operated to scan each filter during the time the assembly is aligned with each filter. Also, a dispersion assembly is preferably mounted immediately upstream of the filter bank, which is also sized to generally correspond to the size of the filters being tested. The dispersion assembly may be correspondingly indexed in unison with the scanning assembly so as to individually challenge and test each filter in the bank.

Some of the objects having been stated, other objects and advantages will appea as the description proceeds, when taken in conjunction with the accompanying drawings in which.

Figure 1:
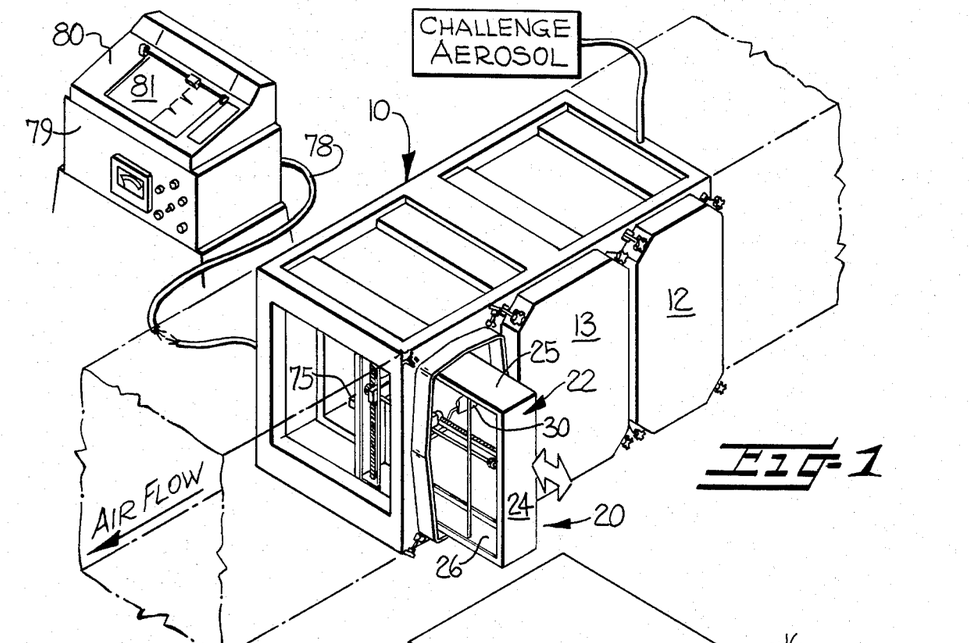
FIG. 1 is a perspective view of a filter housing which incorporates a filter testing apparatus in accordance with the present invention.

Referring more particularly to the drawings, FIG. 1 illustrates a filter housing 10 which incorporates a preferred embodiment of a filter testing apparatus in accordance with the present invention. The housing 10 defines an air passageway adapted to form a part of an air duct system having an airstream pasing therethrough, with the housing including three side access doors 12, 13 and 14. The middle door 13 is adapted to receive a HEPA filter 16, which may be sealably mounted in the housing by any known arrangement, such as the fluid seal and clamping mechanism as disclosed in U.S. Pat. Nos. RE,27,701 and U.S. Pat. No. 4,324,568, and as generally indicated at 18 in FIG. 4. The upstream door 12 may be used to receive a prefilter or the like (not shown), while the downstream door 14 is adapted to receive a scanning assembly 20 which embodies the features of the present invention.

Figure 3:
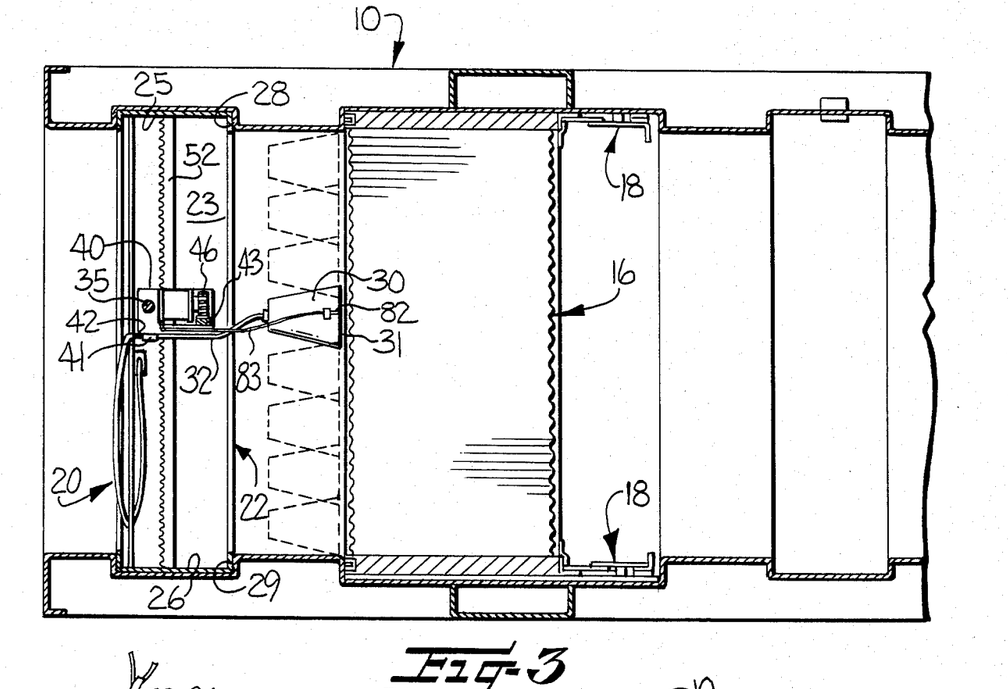
FIG. 3 is a sectional side elevation view of the housing shown in FIG. 1.

The scanning assembly 20 includes a generally rectangular frame 22 which is sized to generally conform to the outline of a filter 16 to be tested. Typically, both the filter 16 and the frame 22 of the scanning assembly are square, and measure about 24×≧inches. The frame includes one pair of opposite sides 23, 24 which define a lateral direction extending therebetween, and a second pair of opposite sides 25, 26 which define a transverse direction extending therebetween. The air flow or longitudinal direction extends through the housing 10 and frame, and is perpendicular to the above defined lateral and transverse directions. Viewing FIG. 3, it will be seen that the housing 10 includes upper and lower trackways 28, 29 which are in alignment with the door 14, for slideably receiving and retaining the assembly in the housing at a point immediately downstream of the filter 16.

The frame 22 of the scanning assembly mounts an air sampling probe 30, which includes a somewhat oval shaped air receiving open end 31 and a tapered hollow body portion. The probe 30 also includes a rigid tubular member 32 communicating with the interior of the probe at the rear end thereof, and which serves as one segment of the means for conveying the sampled air to a remote location for continuous analysis or the like, and as further described below. The area of the open end 31 of the probe is substantially less than the area defined within the frame, and typically measures about 3/16 inches in the lateral direction, and about 4 inches in the transverse direction.

Figure 5:
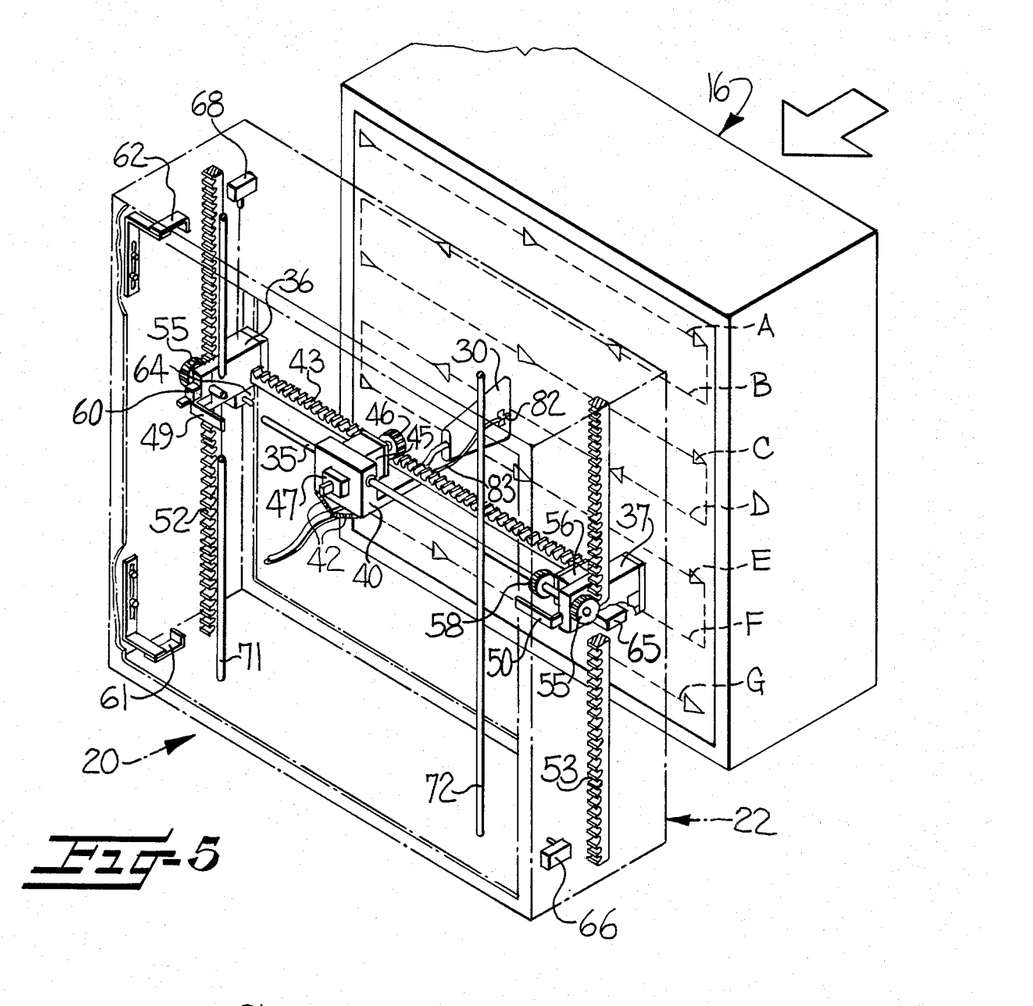
FIG. 5 is a view similar to FIG. 2, and illustrating in more detail the drive system for sequentially traversing and indexing the air sampling probe across the face of the adjacent filter.

The sampling probe 30 is mounted to the frame by an arrangement which permits the probe to continuously face in the longitudinal direction with the end 31 opening toward the adjacent filter 16, while sequentially traversing in the lateral direction across the frame and indexing in the transverse direction. In the specific embodiment as schematically illustrated in FIG. 5, the probe 30 is programmed to make seven lateral traverses indicated by the letters A, B, C, D, E, F, and G, with a movement in the transverse direction occurring at the end of each of the first six lateral movements, and with the transverse movements being a distance not greater than the transverse dimension of the open end of the probe. By this arrangement, the entire face of the adjacent filter may be scanned by the probe. The probe is moved at a relatively slow linear speed, which preferably does not exceed 10 feet per minute. As will be apparent, the exact pattern and number of lateral and transverse movements may vary from the illustrated embodiment, and will depend on the size of the filter and the probe.

The means for mounting the probe to frame 22 includes a guide rod mounted to extend in the lateral direction between two end blocks 36, 37, with the rod 35 extending through the blocks to permit relative rotation therebetween. A probe support 40 is mounted for slideable movement along the rod, and the rigid tubular member 32 of the probe is mounted to the support so as to permit pivotal movement of the probe about a transverse axis, which is indicated at 41 in FIG. 4. The pivotal mounting of the probe permits the assembly to be inserted through the door 14, and also facilitates the complete scanning of the edges of the adjacent filter as hereinafter further described. A pair of springs 42 are provided for normally maintaining the probe aligned in the longitudinal direction.

To drive the support 40 in each direction along the rod 35, there is provided a toothed rack 43 fixedly mounted between the end blocks 36, 37 and so as to be parallel to the rod 35. An electric motor 45 is mounted to the support 40, with the output of the motor including a pinion gear 46 which operatively engages the teeth of the rack 43. A switch 47 is also mounted on the support 40 for reversing the direction of the motor 45, with the switch 47 being operated by contact with the limits 49, 50 which are secured to the blocks 36, 37, respectively.

To index the support 40 in the transverse direction at the end of each lateral traverse, there is provided a mounting arrangement which includes a pair of transversely directed toothed racks 52, 53 mounted along the sides 23, 24 of the frame respectively. The rod 35 mounts a cooperating gear 55 at each end for operatively engaging the racks 52, 53, and an electric motor 56 is mounted on the block 37 and includes an output gear 57 (note FIG. 4) operatively engaging a gear 58 fixed to the rod 35. Thus operation of the motor 56 causes the rod 35 to rotate, and thereby move the blocks 36, 37, support 40, and probe 30 in a transverse direction.

A switch 60 is carried by the block 36 for controlling the direction of the motor 56, with the switch 60 being periodically reversed by contact with the limits 61, 62 as hereinafter further described. The blocks 36, 37 further mount limit switches 64, 65 respectively, which are actuated by contact with the support 40. In addition, a reset switch 66 is mounted in the lower right corner of the frame as seen in FIG. 5, and a start switch 68 is located in the upper left corner.

To describe the sequential operation of the apparatus, it will be assumed that the support 40 is initially located in the upper left corner of the apparatus as seen in FIG. 5, with the start switch 68 having been closed, and the directional switch 47 being set to operate the motor 45 so as to cause the support 40 and thus the probe 30 to trasverse toward the right, i.e., along the lateral path A. Upon the support 40 reaching the right side, the switch 65 will be closed to terminate operation of the motor 45, and the switch 47 will also be actuated by contact with the limit 50 to set the motor 45 for operation in the opposite direction. The closing of the switch 65 concurrently operates the second motor 56 to commence indexing movement in the transverse direction for a predetermined time period, which is timed to permit movement to the level of the path B. After a slightly longer predetermined time period, the motor 45 is energized to cause the support 40 and probe 30 to move to the left along the path B. Upon the support 40 reaching the left side, the limit switch 64 is actuated to terminate operation of the motor 45 and energize the motor 56 for a predetermined time, and the swtich 47 is again actuated by contact with the limit 49 to reverse the direction of the motor 45. This cycle is repeated to advance the probe along paths C, D, E, F, and G, while indexing the probe in the transverse direction upon the probe reaching the end of each lateral traverse. In addition, it will be noted that upon transverse movement between the paths F and G, the switch 60 will be reversed by contact with the limit 61 to set the motor 56 for operation in the reverse direction. Upon the support 40 completing its movement along the path G, the reset switch 66 will be closed, which causes the motor 45 to initially return to the left side of the frame, and then the motor 56 to operate so as to return the support 40 to the start position. When the support reaches the start position, the switch 60 will be contacted by the limit 62, to again reverse the operative direction of the motor 56. Also, the start switch 68 is again closed, to thereby permit the cycle to repeat. The specific circuitry for providing the above functional operation is well within the normal skill of the art, and is therefore not illustrated in further detail herein.

Figure 4:
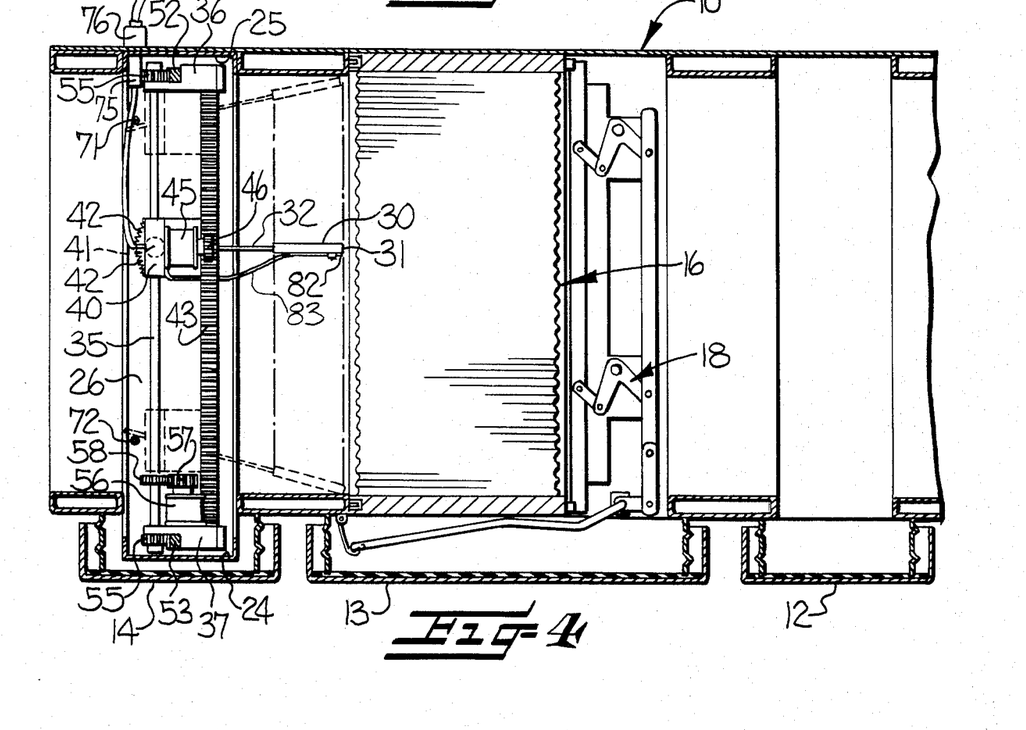
FIG. 4 is a sectional top plan view of the housing shown in FIG. 1.

As best seen in FIGS. 4 and 5, the frame mounts a pair of posts 71, 72 extending in the transverse direction along the two lateral sides 23, 24 respectively. Also, the rigid tubular member 32 of the probe extends longitudinally a distance sufficient to engage the posts upon reaching each of the lateral sides of the frame. By design, the posts 71, 72 are positioned so that the probe is thereby laterally pivoted about the axis 41 and in the direction of its trasverse to thereby permit the probe to scan completely to the sides of the adjacent filter at the end of each trasverse.

The scanning assembly 20 further comprises means for conveying air received in the open end 31 of the probe to a remote location for continuous analysis. This air conveying means includes the rigid tubular member 32 of the probe as noted above, as well as a flexible hose 74 secured to the free end of the tubular member and leading to a coupling 75 mounted on the side 23 of the frame. A mating coupling 76 is secured in the side wall of the housing, with the two couplings designed to interengage upon the assembly 20 being slid into its operative position through the door 14. The couplings 75, 76 also may be used to automatically interconnect the electrical lines leading to the two motors 45 and 56.

From the coupling 76, an air tube 78 conveys the sampled air to a linear photometer 79 of conventional design, and which is adapted to measure the concentration of any leaking challenge aerosol. A printer 80 is operatively connected to the output of the photometer, which produces a line graph which continuously plots the instantaneous rate of leaking challenge aerosol on a moving sheet of paper 81, to thereby permit the magnitude of a leak and its location on the face of the filter to be readily determined.

Figure 6:
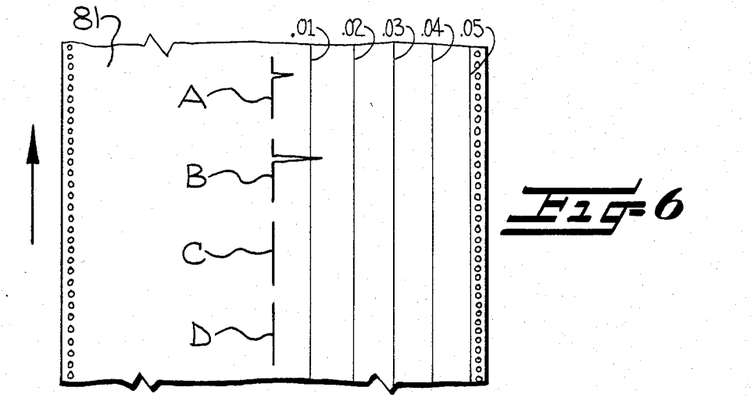
FIG. 6 is a representation of a printed output sheet which indicates the rate and location of leaks in the filter being tested.

In the example shown in FIG. 6, the output as printed on the moving sheet of paper 81 is calibrated in terms of the concentration of the detected aerosol. Thus if the concentration of a single leak in the filter is 0.04 percent, the filter would have an overall efficiency of 99.96 percent, and would be unsatisfactorily under accepted industry tolerances. The plotted output also permits the concentration of each leak to be determined, and the overall efficiency of the filter determined by the addition of the concentration readings of each leak. Further, the plot for each of the paths A-G are identifiable, which permits the location of the leak to be readily determined by relating the position of the leak on the plot to the face of the filter.

Figure 2:
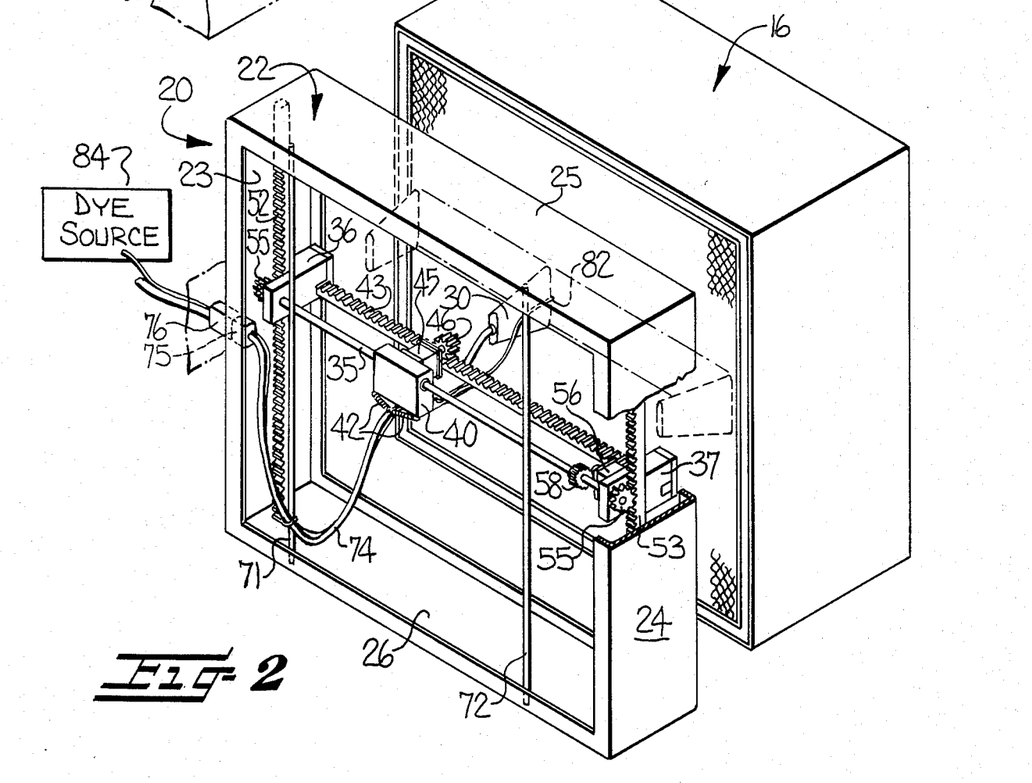
FIG. 2 is a perspective view of the testing apparatus of FIG. 1, and positioned adjacent a HEPA filter to be tested.

The scanning assembly 20 may further include means for applying a visible dye onto the face of the filter upon the rate of leaking challenge material exceeding a predetermined minimum, and with the dye being applied at a point closely adjacent the leak to further identify its location. For this purpose, a dye nozzle 82 is mounted on the side of the probe as best seen in FIG. 2, and a hose 83 leads from the nozzle, through the couplings 75, 76, to a suitable dye source 84. A conventional control (not shown), which is actuated by the output of the photometer, may be provided for ejecting the dye from the nozzle upon the aerosol concentration exceeding a predetermined level.

Figure 7:
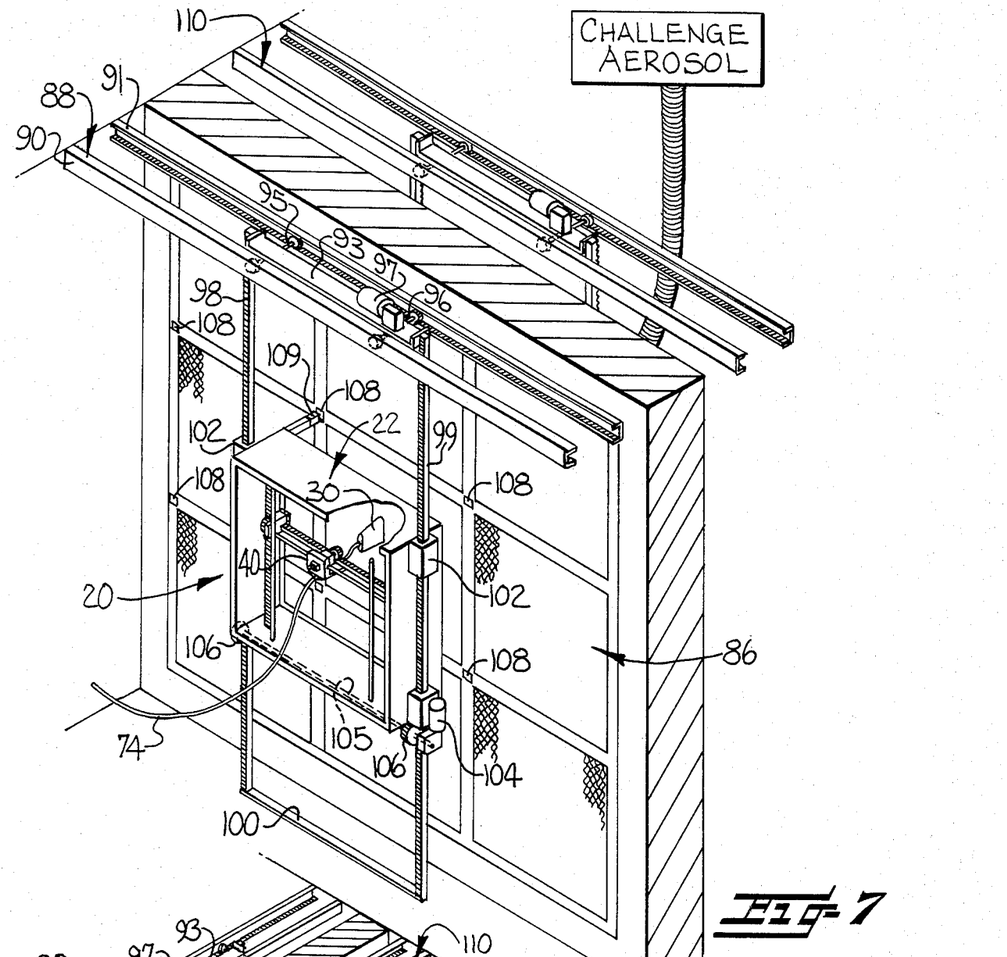
FIG. 7 is a partly schematic perspective view of the testing apparatus of the present invention associated with a bank of parallel filters.
Figure 8:
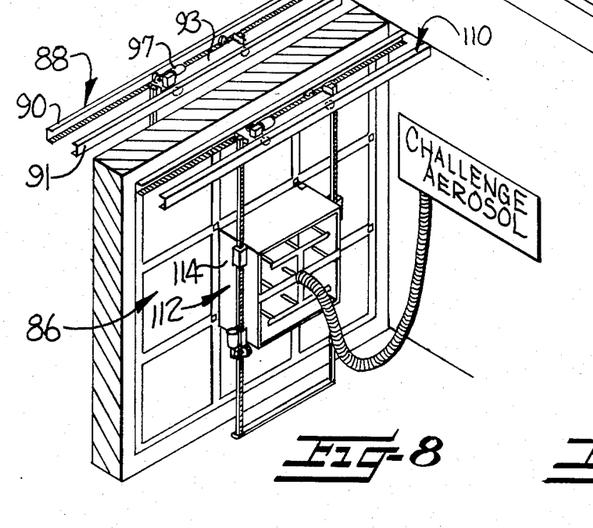
FIG. 8 is a perspective view of the upstream side of the filter bank shown in FIG. 7, and illustrating an aerosol dispersion assembly.

FIGS. 7 and 8 illustrate the testing apparatus of the present invention in association with a parallel bank of filters 86. In this embodiment, the scanning assembly 20 is mounted to a framework 88 which is adapted to selectively index the assembly 20 to a position aligned with each filter in the bank, and whereby the filters may be individually scanned in a sequential manner.

The framework 88 is mounted immediately downstream of and parallel to the filter bank 86, and comprises a pair of parallel channels 90, 91 extending along the upper side of the bank. The channels each mount a toothed rack, and a carriage 93 is positioned to move along the channels. More particularly, the carriage 93 includes a pair of axles 95, 96, with each axle mounting a pinion gear at each end. A reversible electric motor 97 is carried by the carriage, which operates to rotate the axle 96 and thus drive the carriage in either direction.

The carriage 93 also supports a pair of freely depending posts 98, 99, with each post including a toothed rack extending along its length. The lower end of the posts are interconnected by a support brace 100, which is located adjacent the floor of the duct. The scanning assembly 20 is mounted between the two posts 98, 99 by the four sleeves 102, and is movable along the posts by an arrangement which includes a reversible electric motor 104, a drive shaft 105, and gears 106 on each end of the shaft which engage the teeth of the posts.

For controlling the movement of the scanning assembly, there is provided a sensor 108 in the upper left corner of the assembly as seen in FIG. 7, and a magnetic pickup 109 is mounted at the upper left corner of each filter. A suitable switching arrangement is provided whereby upon the conclusion of the scanning operation in front of a particular filter, the assembly is advanced by operation of either the motor 97 or motor 104 until the sensor 108 indicates that the assembly is in the proper position in alignment with the next filter. Thus the assembly may be selectively indexed to a position aligned with each filter in the bank, and such that the probe may be mioved along the face of each filter in the manner described above and so that the entire face of each filter may be scanned by the probe. The switching circuitry for the described operative movement of the scanning assembly is well within the normal skill of the art, and thus is not disclosed in further detail herein.

Figure 9:
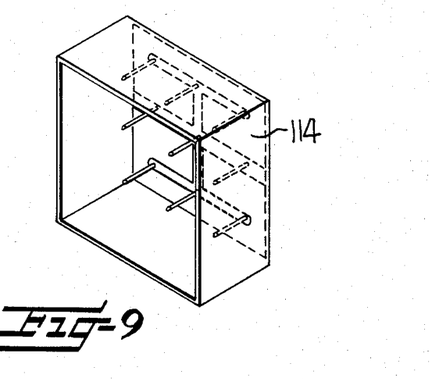
FIG. 9 is a perspective view of the inside of the dispersion assembly as seen in FIG. 8.

During testing of the filters in the bank 86, a challenge aerosol may be introduced at a point upstream of the bank so as to challenge all of the filters in the bank. Preferably however, means are provided for challenging each filter individually and in coordination with the positioning of the scanning assembly 20, to thereby avoid undue loading of the filters with the challenge aerosol. For this purpose a second framework 110 may be mounted within the housing at a location immediately upstream of and parallel to the filter bank for mounting an aerosol dispersion assembly 112. The assembly 112 includes a rectangular housing 114 which is sized to generally conform to the size of the individual filters in the bank. As seen in FIG. 9, the assembly includes a plurality of separate outlets 115 for introducing a filter challenge aerosol into the airstream at a point immediately upstream of a selected filter, and dispersing the aerosol across the face of the filter. The dispersion assembly 112 is mounted to the framework 110 for selective indexing movement to a position aligned with each filter in the bank, and in a manner corresponding to that described above with respect to the scanning assembly 20. In addition, the movement of the dispersion assembly is coordinated with the movement of the scanning assembly, so that the dispersion assembly may be operated to introduce a filter challenge aerosol immediately upstream of each filter while the scanning assembly is positioned immediately downstream of the same filter.

In the drawings and specification, there has been set forth a preferred embodiment of the invention, and although specific terms are employed, they are used in a generic and descriptive sense only and not for purposes of limitation.

That which is claimed is:

1. An apparatus adapted for detecting minute leaks of unfiltered air through an air filter, and which is characterized by the ability to scan the full area of the face of an adjacent filter and so as to permit the collection and sampling of air passing through a relatively small portion of the total area of the face of the filter at any given movement, and comprising a generally rectangular frame which is sized to generally conform to the outline of a filter to be tested, and which defines a lateral direction extending between one pair of opposite sides, a transverse direction extending between the other pair of opposite sides, and a longitudinal direction extending through the frame and perpendicular to the lateral and transverse directions, an air sampling probe having an air receiving open end, with the area of the open end being substantially less than the area defined within said frame, means mounting said probe to said frame with said probe open end facing in the longitudinal direction and so as to be adapted to open toward the face of an adjacent filter, and including drive means for sequentially traversing the probe in each lateral direction across the frame, and indexing the probe in the transverse direction a distance not greater than the transverse dimension of said open end of said probe and so that the entire face of an adjacent filter may be scanned by the probe, and means for conveying air received in the open end of said probe to a remote location for continuous analysis or the like.

2. The apparatus as defined in claim 1 wherein said probe mounting means includes, a guide rod disposed to extend along the lateral direction, a probe support mounted for slideable movement along said guide rod, means mounting said probe to said probe support, and wherein said drive means includes first motor means for advancing said probe support in each direction along the length of said guide rod, to thereby traverse the probe in each lateral direction.

3. The apparatus as defined in claim 2 wherein said drive means further includes means mounting said guide rod for movement in the transverse direction, and second motor means for moving the guide rod a predetermined distance in the transverse direction upon the probe reaching the end of each lateral trasverse to thereby index the probe in the transverse direction.

4. The apparatus as defined in claim 3 wherein said first motor means includes a toothed rack mounted in parallel fixed relation to said guide rod, and a first electic motor mounted on said probe support and including an output gear operatively engaging said toothed rack.

5. The apparatus as defined in claim 4 wherein said second motor means includes a second toothed rack fixedly mounted to said frame and extending in said transverse direction, and a second electric motor fixedly mounted with respect to said guide rod and including an output gear operatively engaging said second toothed rack.

6. The apparatus as defined in any one of claims 2–5 wherein said means mounting said probe to said probe support includes a pivotal connection for permitting the probe to pivot about an axis extending in the transverse direction.

7. The apparatus as defined in claim 6 wherein said frame mounts a post extending in the transverse direction along each of the two lateral sides thereof, and wherein said probe includes a longitudinally extending arm which is adapted to engage the adjacent post upon reaching the end of each lateral traverse, and such that the probe is pivoted laterally in the direction of its traverse to thereby permit the probe to scan completely to the sides of an adjacent filter.

8. The apparatus as defined in any one of claims 1–5 further comprising means for continuously analyzing the air received in the open end of said probe to determine the rate of a leaking challenge material or the like through the filter, and means for continuously indicating the rate of leaking challenge material.

9. The apparatus as defined in claim 8 wherein said indicating means includes means for printing the instantaneous rate of leaking challenge material or the like on a continuously moving sheet of paper, to thereby permit the magnitude of a leak and its location on the face of the filter to be readily determined.

10. The apparatus as defined in any one of claims 1–5 further comprising means for applying a visible dye onto the face of the filter upon the rate of leaking challenge material exceeding a predetermined minimum, and with the dye being applied closely adjacent the leak to identify its location.

11. An apparatus for filtering an airstream which is characterized by the ability to detect minute leaks of unfiltered air therethrough, and comprising a housing defining an air passageway adapted to form a part of an air duct system having an airstream passing therethrough, means for sealably mounting a filter within said housing, a scanning assembly comprising (a) a generally rectangular frame which is generally sized to conform to the outline of the interior of said housing, with said frame defining a lateral direction extending between one pair of opposite sides, a transverse direction extending between the other pair of opposite sides, and a longitudinal direction extending through the frame and perpendicular to the lateral and transverse directions, (b) an air sampling probe having an air receiving open end, and (c) means mounting said probe to said frame with said probe open end facing in the longitudinal direction, and including means for traversing the probe in the lateral direction across the frame, and indexing the probe in the transverse direction a distance not greater than the transverse dimension of the open end of said probe upon the probe reaching the end of each lateral traverse, and means mounting said scanning assembly within the housing at a location immediately downstream of the filter, and with the open end of said probe opening toward the face of the adjacent filter, said mounting means including means for conveying air received in the open end of the probe to a remote location exteriorly of the housing for analysis or the like, and such that the scanning assembly is able to scan the full area of the face of the adjacent filter while collecting and sampling air passing through a relatively small portion of the total area of the face of the filter at any given moment.

12. The apparatus as defined in claim 11 wherein said means for sealably mounting a filter within the housing includes a side access door in said housing for inserting or removing a filter, and wherein said means mounting said scanning assembly includes a second side access door in said housing for inserting or removing said scanning assembly.

13. The apparatus as defined in claim 12 wherein said means mounting said scanning assembly further includes a trackway fixedly mounted inside said housing in alignment with said second door for slideably receiving said scanning assembly therealong, and wherein said air conveying means includes a first tube segment carried by said scanning assembly, a second tube segment extending through the wall of said housing, and a coupling releaseably interconnecting said first and second segments.

14. The apparatus as defined in any one of claims 11-13 further comprising means positioned exteriorly of said housing for analyzing the air passing through said air conveying means to determine the rate of leaking challenge material or the like through the filter.

15. The apparatus as defined in claim 14 wherein said analyzing means further comprises means for continuously plotting the rate of leaking challenge material or the like, to thereby permit the magnitude of a leak and its location on the face of the filter to be readily determined.

16. An apparatus for filtering an airstream and characterized by the ability to detect minute leaks of unfiltered air therethrough, and comprising a housing defining an air passageway adapted to form a part of an air duct system having an airstream passing therethrough, means for sealably mounting a bank of filters in a parallel arrangement in said housing such that the airstream passing through the housing passes through the bank of filters, a framework mounted within said housing at a location immediately downstream of and parallel to said filter bank, a filter scanning assembly including a probe having an air receiving open end, said scanning assembly being sized to generally conform to the size of the individual filters in said bank, means mounting said scanning assembly to said framework for selective indexing movement to a position aligned with each filter in said bank, and with said probe open end being adapted to continuously collect a sample of the air passing through the adjacent filter, and means for conveying air collected in the open end of said probe to a remote location exteriorly of said housing for analysis or the like.

17. The apparatus as defined in claim 16 further comprising a second framework mounted within said housing at a location immediately upstream of and parallel to said filter bank, a dispersion assembly which is sized to generally conform to the size of the individual filters in said bank, and including means for introducing a filter challenge material into an airstream, and means mounting said dispersion assembly to said second framework for selective indexing movement to a position aligned with each filter in said bank, and whereby the dispersion assembly may be operated to introduce a filter challenge material immediately upstream of each filter while said scanning assembly is positioned immediately downstream of such filter.

18. The apparatus as defined in claim 17 wherein said scanning assembly includes a generally rectangular frame, and means mounting said probe to said frame for sequentially traversing the probe laterally across the frame and indexing the probe in the transverse direction upon the probe reaching the end of each lateral traverse.

19. A method for testing for leakage of unfiltered air through an air filter, and characterized by the ability to determine the magnitude and location of each leak on the face of face filter, and comprising the steps of passing an airstream through the filter, introducing a filter challenge material into the airstream upstream of the filter, traversing an air sampling probe in a predetermined pattern across the full area of the downstream face of the filter, continuously analyzing the air received in the air sampling probe to determine the rate of leaking challenge material through the filter, and continuously plotting the rate of leaking challenge material, to thereby permit the magnitude of a leak and its location on the face of the filter to be readily determined.

20. The method as defined in claim 19 wherein the traversing step includes sequentially moving the probe in a lateral direction across the face of the filter, and indexing the probe in a transverse direction a distance not greater than the transverse dimension of the probe at the end of each lateral movement.

21. The method as defined in claim 19 or 20 wherein the step of plotting the rate of leaking challenge material includes printing the instantaneous rate of leaking challenge material on a continuously moving sheet of paper.

22. The method as defined in claim 19 or 20 comprising the further step of applying a visible dye onto the face of the filter upon the rate of leaking challenge material exceeding a predetermined minimum, and with the dye being applied adjacent the location of the leak.

23. A method for testing for leakage of unfiltered air through each of a plurality of air filters mounted in a parallel bank of filters, comprising the steps of
providing an air sampling assembly which is sized to generally conform to the size of the individual filters in the bank,
progressively indexing the air sampling assembly across the downstream side of the filter bank, and such that the assembly is aligned with each filter in the bank for a selected dwell time,
introducing a filter challenge material at a location immediately upstream of each filter in the bank in a sequence corresponding to the indexing of the air sampling assembly, and
analyzing the air received by the air sampling assembly and so as to indicate the amount of any leaking challenge material through each individual filter.

24. The method as defined in claim 23 wherein the air sampling assembly includes a probe having an air receiving opening of relatively small area compared to the area of the face of each filter, and comprising the further step of traversing the probe across the face of each filter during the dwell time of the assembly in alignment with each filter.

25. The method as defined in claim 24 wherein the analyzing step includes determining the rate of leaking challenge material, and visually displaying the rate to thereby permit the location and magnitude of leaks on the face of each filter to be determined.

26. A method for testing for leakage of unfiltered air through an air filter, and characterized by the ability to physically indicate the location of each leak of predetermined magnitude on the face of the filter, and comprising the steps of
passing an airstream through the filter,
introducing a filter challenge material into the airstream upstream of the filter,
traversing an air sampling probe in a predetermined pattern across the full area of the downstream face of the filter,
continuously analyzing the air received in the air sampling probe to determine the rate of leaking challenge material through the filter, and
ejecting a visible dye onto the face of the filter from the traversing probe upon the rate of leaking challenge material exceeding a predetermined minimum, and such that the dye is applied closely adjacent the location of the leak, and whereby the dye will visibly indicate the location of each leak of predetermined magnitude.

27. An apparatus for filtering an airstream and characterized by the ability to detect minute leaks of unfiltered air therethrough, and comprising
a housing defining an air passageway adapted to form a part of an air duct system having an airstream passing therethrough,
means for sealably mounting a bank of filters in a parallel arrangement in said housing such that the airstream passing through the housing passing through the bank of filters,
a framework mounted within said housing at a location immediately downstream of and parallel to said filter bank,
an air sampling assembly including a peripheral frame which is sized to generally conform to the size of the individual filters in said bank, and a probe having an air receiving opening disposed within said frame,
means mounting said air sampling assembly to said framework for selective indexing movement to a position aligned with each filter in said bank, and with said probe opening being adapted to collect a sample of the air passing through the adjacent filter,
means for conveying air collected in the opening of said probe to a remote location exteriorly of said housing for analysis or the like, and
dispersion means mounted upstream of said bank for individually challenging each filter of said bank with a filter challenge material and in a sequence corresponding to the indexing of said air sampling assembly.

28. The apparatus as defined in claim 27 wherein said dispersion means comprises
a second framework mounted within said housing at a location immediately upstream of and parallel to said filter bank,
a dispersion assembly which is sized to generally conform to the size of the individual filters in said bank, and including means for introducing a filter challenge material into an airstream, and
means mounting said dispersion assembly to said second framework for selective indexing movement to a position aligned with each filter in said bank.

29. The apparatus as defined in claim 28 wherein said air sampling assembly includes means for sequentially traversing the probe laterally across the frame and indexing the probe in the transverse direction upon the probe reaching the end of each lateral traverse.

* * * * *

UNITED STATES PATENT AND TRADEMARK OFFICE
CERTIFICATE OF CORRECTION

PATENT NO. : 4,494,403

DATED : January 22, 1985

INVENTOR(S) : Cecil W. Bowers et al

It is certified that error appears in the above-identified patent and that said Letters Patent is hereby corrected as shown below:

Column 3, line 21, "pasing" should be -- passing --.

Column 3, line 37, "24 $\geq$ X =" should be -- 24 X 24 --.

Column 5, line 2, "trasverse" should be -- traverse --.

Column 5, line 47, "trasverse" should be -- traverse --.

Column 5, line 49, "trasverse" should be -- traverse --.

Column 6, line 8, "0.04" should be -- .04 --.

Column 6, line 10, "unsatisfactorily" should be
-- unsatisfactory --.

Column 7, line 3, "mioved" should be -- moved --.

Column 7, line 50, "movement" should be -- moment --.

Column 8, line 23, "trasverse" should be -- traverse --.

UNITED STATES PATENT AND TRADEMARK OFFICE
CERTIFICATE OF CORRECTION

PATENT NO. : 4,494,403

DATED : January 22, 1985

INVENTOR(S) : Cecil W. Bowers et al

It is certified that error appears in the above-identified patent and that said Letters Patent is hereby corrected as shown below:

Column 12, line 19, the second "passing" should be -- passes --.

Signed and Sealed this

Twenty-third Day of July 1985

[SEAL]

Attest:

DONALD J. QUIGG

Attesting Officer     Acting Commissioner of Patents and Trademarks